United States Patent
Stone et al.

(10) Patent No.: US 6,836,241 B2
(45) Date of Patent: Dec. 28, 2004

(54) METHOD FOR OPTIMAL SEARCH SCHEDULING IN SATELLITE ACQUISITION

(75) Inventors: Jesse Stone, Palo Alto, CA (US); Andrew Chou, San Mateo, CA (US); Wallace Mann, Mill Valley, CA (US)

(73) Assignee: SiRF Technology, Inc., San Jose, CA (US)

( * ) Notice: Subject to any disclaimer, the term of this patent is extended or adjusted under 35 U.S.C. 154(b) by 212 days.

(21) Appl. No.: 10/126,853

(22) Filed: Apr. 19, 2002

(65) Prior Publication Data

US 2003/0197641 A1 Oct. 23, 2003

(51) Int. Cl.[7] .................................................. G01S 5/14
(52) U.S. Cl. .................................................. 342/357.15
(58) Field of Search ................... 342/357.15; 701/213; 706/42

(56) References Cited

U.S. PATENT DOCUMENTS

| | | | | |
|---|---|---|---|---|
| 4,928,107 A | * | 5/1990 | Kuroda et al. | 342/357.15 |
| 6,052,082 A | * | 4/2000 | Hassan et al. | 342/357.04 |
| 6,181,274 B1 | * | 1/2001 | Pratt et al. | 342/357.04 |
| 6,256,583 B1 | * | 7/2001 | Sutton | 701/215 |
| 6,259,398 B1 | * | 7/2001 | Riley | 342/357.04 |
| 6,384,778 B1 | * | 5/2002 | Campbell | 342/359 |
| 2001/0051936 A1 | * | 12/2001 | Michalewicz | 706/46 |
| 2003/0050902 A1 | * | 3/2003 | Buczak et al. | 706/13 |

FOREIGN PATENT DOCUMENTS

| | | |
|---|---|---|
| EP | 0 635 728 A1 | 1/1995 |
| WO | WO 01/71375 A1 | 9/2001 |

OTHER PUBLICATIONS

Seybold, John S.; Belkerdid Madjid A. "Performance Analysis of An Expanding–Search Algorithm For Coarse Acquisition of Dess Signals," 1996 IEEE, pp. 148–155.
Ward, Phillip W., "GPS Receiver Search Techniques," 1996 IEEE, pp. 604–611.

* cited by examiner

Primary Examiner—Gregory C. Issing
(74) Attorney, Agent, or Firm—Edward C. Kwok; MacPherson Kwok Chen & Heid LLP (57) ABSTRACT

A method in a Global Positioning System (GPS) receiver achieves enhanced performance by scheduling searches in the Doppler search space according to a cost function. The cost function relates to both the cost of building a 3-dimensional correlation grid and the cost of searching satellite, code phase, Doppler and integration time interval spaces for values that provide a maximum in the correlation grid. In one embodiment, after the clock Doppler is determined upon acquiring one satellite, the Doppler search range associated with a cell in the grid is dominated by the receiver's own motion. The scheduler schedules searching of the Doppler search space using search ranges determined empirically by the expected receiver velocity. In one embodiment, the scheduler increases integration times before changing Doppler search ranges, which require a recalculation of the grid.

33 Claims, 5 Drawing Sheets

| Ultrastack amount (ms) | doppler range | cost per ms to build grid | 1 | 2 | 4 | 8 | 16 | 32 | 64 | 128 | 256 | 512 | 1024 | 2048 |
|---|---|---|---|---|---|---|---|---|---|---|---|---|---|---|
| 0.125 | 2000 | 8 | 8 | 8 | 16 | 32 | 64 | 128 | 256 | 512 | 1024 | 2048 | 4096 | 8192 |
| 0.25 | 1000 | 4 | 4 | 4 | 8 | 16 | 32 | 64 | 128 | 256 | 512 | 1024 | 2048 | 4096 |
| 0.5 | 500 | 2 | 2 | 2 | 4 | 8 | 16 | 32 | 64 | 128 | 256 | 512 | 1024 | 2048 |
| 1 | 250 | 1 | 1 | 1 | 2 | 4 | 8 | 16 | 32 | 64 | 128 | 256 | 512 | 1024 |
| 2 | 125 | 0.5 | 0.5 | 0.5 | 1 | 2 | 4 | 8 | 16 | 32 | 64 | 128 | 256 | 512 |
| 4 | 62.5 | 0.25 | 0.25 | 0.25 | 0.5 | 1 | 2 | 4 | 8 | 16 | 32 | 64 | 128 | 256 |
| 8 | 31.25 | 0.125 | 0.125 | 0.125 | 0.25 | 0.5 | 1 | 2 | 4 | 8 | 16 | 32 | 64 | 128 |
| 16 | 15.63 | 0.063 | 0.063 | 0.063 | 0.125 | 0.25 | 0.5 | 1 | 2 | 4 | 8 | 16 | 32 | 64 |
| 32 | 7.81 | 0.031 | 0.031 | 0.031 | 0.063 | 0.125 | 0.25 | 0.5 | 1 | 2 | 4 | 8 | 16 | 32 |
| 64 | 3.91 | 0.016 | 0.016 | 0.016 | 0.031 | 0.063 | 0.125 | 0.25 | 0.5 | 1 | 2 | 4 | 8 | 16 |
| 128 | 1.95 | 0.008 | 0.008 | 0.008 | 0.016 | 0.031 | 0.063 | 0.125 | 0.25 | 0.5 | 1 | 2 | 4 | 8 |

FIG. 4

| Ultrastack amount (ms) | doppler range | cost per ms to build grid | | | | | | | | | | | | |
|---|---|---|---|---|---|---|---|---|---|---|---|---|---|---|
| 0.125 | 2000 | 8 | 1 | | | | | | | | | | | |
| 0.25 | 1000 | 4 | | 2 | | | | | | | | | | |
| 0.5 | 500 | 2 | | | 3 | | | | | | | | | |
| 1 | 250 | 1 | | | | 4 | | | | | | | | |
| 2 | 125 | 0.5 | | | | | 5 | 6 | 7 | | | | | |
| 4 | 62.5 | 0.25 | | | | | 11 | 12 | 13 | 14 | | | | |
| 8 | 31.25 | 0.125 | | | | | | | 19 | 20 | 21 | 22 | 23 | |
| 16 | 15.63 | 0.063 | | | | | | | | | 25 | 26 | 27 | 28 |
| 32 | 7.81 | 0.031 | | | | | | | | | | | | |
| 64 | 3.91 | 0.016 | | | | | | | | 8 | 9 | 10 | | |
| 128 | 1.95 | 0.008 | | | | | | | | | 15 | 16 | 17 | 18 |
| | | | 1 | 2 | 4 | 8 | 16 | 32 | 64 | 128 | 256 | 512 | 1024 | 2048 |

FIG. 5

METHOD FOR OPTIMAL SEARCH
SCHEDULING IN SATELLITE ACQUISITION

FIELD OF THE INVENTION

The present invention relates generally to signal processing under Global Positioning System (GPS). In particular, the present invention relates to optimal scheduling for satellite acquisition under GPS, relative to certain search performance criteria.

DISCUSSION OF THE RELATED ART

Location determination using GPS is achieved in a receiver by processing signals received from multiple GPS satellites. The time difference between signal transmission at a GPS satellite and the same signal being received at the receiver provides a range measurement ("pseudo-range") representative of the distance between the satellite and the receiver. To allow the signal of each GPS satellite to be distinguished from the signals of other GPS satellites, each GPS satellite modulates the carrier signal (1575.42 MHz) with a 1024-chip pseudo-random code (PRN) assigned to that GPS satellite. The PRN has a 1-millisecond period. In theory, the PRNs of the GPS satellites are mutually orthogonal to allow them to be individually recovered at the receiver. Because the position of each satellite at signal transmission time is relatively accurately known, the position of the receiver can be determined in theory using four or more pseudo-ranges from multiple GPS satellites.

The time difference between signal transmission and the signal reaching the receiver is often represented by the quantity "code phase," which is the time difference modulo the period of the PRN. To obtain a pseudo-range, the receiver processes the signal received, taking into consideration signal and receiver parameters, some of which values are not accurately known a priori. For example, the motion of the satellite relative to the receiver and the imperfection in the receiver clock lead to frequency shifts ("Doppler effects") in the received signal, known respectively as "satellite Doppler" and "clock Doppler." The receiver's own motion also contributes a Doppler effect in the received signal. In practice, with a receiver clock accuracy of 1 part per million, the clock Doppler introduces an uncertainty of in the order of 1575 Hz. Because the GPS carrier wavelength is 19 cm., a 1/0.19 Hz uncertainty is introduced per meter per second of receiver velocity; thus a +/−200 Hz uncertainty is introduced for a receiver traveling at a velocity of 85 mph.

To acquire a satellite (i.e., to determine sufficiently accurately the code phase and the Doppler effects as to provide a pseudo-range down to the nano-second range), a receiver may search the code phase and Doppler uncertainty ranges for the code phase and Doppler values that match best with the received signal. In such a search, the present invention provides a search schedule that maximizes certain specified performance criteria (e.g., maximizes the probability for acquiring a satellite within a specified processing time of a digital signal processor).

SUMMARY OF THE INVENTION

The present invention provides, in a location determination apparatus, a method for scheduling a search of a parameter space. The method includes (a) dividing the parameter space into search regions, (b) computing a figure of merit associated with each search region, and (c) scheduling a search of the search regions according to optimizing a function of the figure of merit.

In one embodiment of the present invention, a method is provided in a Global Positioning System (GPS) receiver that achieves enhanced performance by scheduling searches in the Doppler search space according to a cost function. In that embodiment, the cost function relates to both the cost of constructing a 3-dimensional correlation grid associated with each GPS satellite, code phase and Doppler range ("grid building cost") and the cost of probing the correlation grid for a maximum correlation value ("search cost"). In one implementation, the correlation grid is constructed by creating a table of correlation values for various hypothesized code phase values, integrated over various integration time intervals. The integration can be performed using a fast fourier transform (FFT). Probing this correlation grid is achieved by searching for the integration time, code phase and Doppler values that maximize an "ambiguity function" (i.e., the modulus of the complex correlation function resulting from the FFT). (Additional search parameters may include acceleration and the size of coherent blocks in non-coherent combinations). In that implementation, extending integration time intervals—which enhances the signal-to-noise ration (SNR)—can be achieved by processing incrementally, while changing the range of Doppler values requires recalculating the correlation values.

In addition to a cost function, a method of the present invention includes a reward or value function for each search region. In one instance, the reward function relates to a probability of acquiring a satellite signal in the cells of search region. (A cell is the smallest unit of space within a search region.) By scheduling search of cells having high ratio of reward vis-à-vis cost (i.e., the figure of merit being representative of a constraint maximization), the probability of acquiring satellite is maximized per unit cost. In one instance, the reward function is independent of the Doppler search range and the integration times. In an embodiment described above, the scheduler extends integration time intervals before changing Doppler search ranges, thus optimizes searching of each cell in the grid over various integration times, while rebuilding the grid only when necessary. Cost savings are thus achieved through reduction of grid construction cost.

In one embodiment, after the clock Doppler has been determined upon acquiring one satellite, the Doppler search range associated with a cell in the grid is dominated by the receiver's own motion. In one embodiment of the present invention, the scheduler schedules searching the Doppler search space using search ranges determined empirically by the expected receiver velocity. In particular, when the receiver experiences a weak signal condition, the scheduling takes advantage of the fact that such a condition also suggests a low receiver velocity. Under such a condition, a tighter Doppler search range is scheduled to decrease search cost, without significantly reducing the probability of signal acquisition.

In one embodiment, an ultra-stacked technique is used.

In one embodiment, the Doppler search expands from a minimum Doppler search range, which is selected for low cost, to a maximum Doppler search range covering substantially all the possible Doppler values. In one implementation, the Doppler search range increases by a factor of 4 to reduce the total cost of rebuilding grid throughout the search. In one implementation, certain search regions having prohibitive costs are not searched.

The present invention is better understood upon consideration of the detailed description below and the accompanying drawings.

BRIEF DESCRIPTION OF THE DRAWINGS

To facilitate cross-reference among the figures and to simplify the detailed description, like elements in the figures are provided like reference numerals.

DETAILED DESCRIPTION OF THE PREFERRED EMBODIMENTS

The present invention provides a method for organizing a search in a parameter space to maximize certain performance criteria (e.g., reducing average computation time or reducing computation complexity in a location determination. In the following detailed description, a method of the present invention is illustrated by a method that schedules a search in the integration time interval, code phase and the Doppler search spaces. In that example, suitable performance criteria include: 1) maximizing the probability of satellite acquisition within a specified processing time, or 2) maximizing the probability of satellite acquisition within a specified processing time, subject to the additional criterion that the search of the search spaces must complete within a second specified processing time.

The present invention is illustrated by an application in the context of a receiver location determination under GPS. According to one embodiment, location determination is accomplished using a GPS receiver that typically includes a conventional digital signal processor that is supported by volatile and non-volatile memory elements. To prepare the received signal for digital signal processing, the received signal is suitably amplified, filtered, down-converted from the GPS carrier frequency (nominally at 1575.42 MHz) to a signal of an intermediate frequency $F_{IF}$ and digitized. In the remainder of this detailed description, this digitized signal is referred to as the "received signal."

Figure 1:
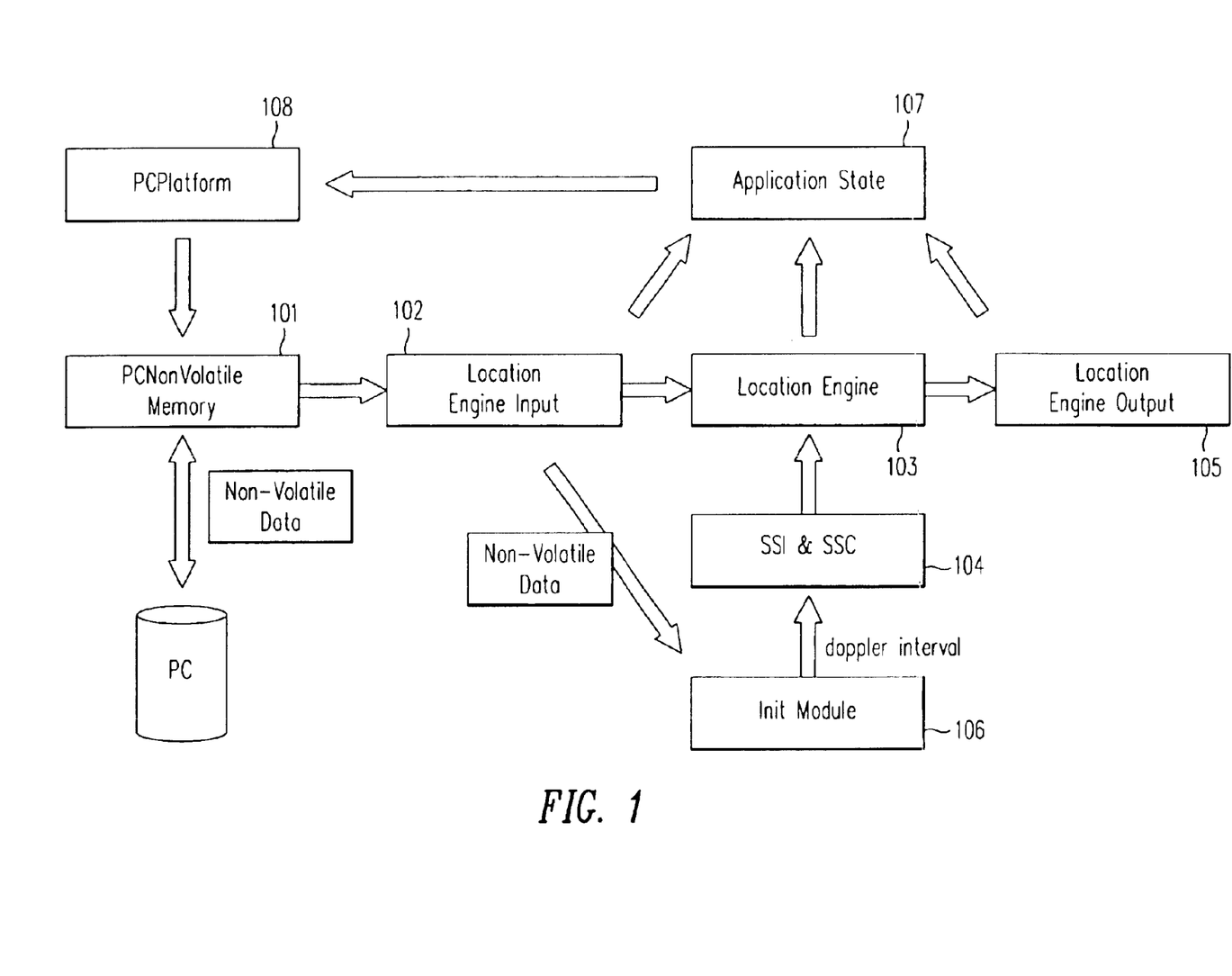
FIG. 1 illustrates the data flow in a location determination apparatus 100, which can be used to implement one embodiment of the present invention.

FIG. 1 illustrates the data flow in a location determination apparatus 100, which can be used to implement one embodiment of the present invention. Location determination apparatus 100 can be implemented, for example, on a platform based on the "PC" architecture, which is well known to those skilled in the art. As shown in FIG. 1, location determination apparatus 100 includes (a) non-volatile memory module 101 for managing a non-volatile memory, (b) location engine input module 102 for managing input data to location engine module 103 (e.g., the received signal, initial parameter values, etc.), (c) signal search information and constraint (SSI & SSC) module 104 for managing information relevant to acquisition of the GPS satellite signals and parameters value intervals and constraints used by location engine 103 for acquiring a GPS satellite signal, (d) location engine module 103 for performing the receiver location determination, (e) location engine output module 105 for providing and formatting output data associated with the receiver location determination, (f) initialization module 106 providing initial parameter values, (g) application state module 107 for maintaining the operational states of location determination apparatus 100, and (h) platform module 108 that controls operations of location determination apparatus 100. These modules can be implemented, for example, by java classes that can be run in a microprocessor or a digital signal processor (DSP) of a handheld device.

In this embodiment, location engine 103 determines the receiver location by searching within a region centered at an approximate location. (The error in the approximate location also introduces a second-order Doppler effect of about 1 Hz per kilometer of error.) One such method for determining the receiver location is described in co-pending U.S. patent application ("Copending Application I"), Ser. No. 09/782,648, entitled "Location-Determination Method and Apparatus," filed on Feb. 21, 2001, assigned to Enuvis, Inc., which is also the Assignee of the present application. The disclosure of Copending Application I is hereby incorporated herein by reference in its entirety. In that method of Co-pending Application I, a receiver location provides a significant value (e.g., a maximum, or a value exceeding a predetermined threshold value) in a joint maximum likelihood function when that location is likely to yield the measured estimated code-phase and measured frequency shift. The estimated frequency shift is a deviation from the intermediate frequency $f_{IF}$ of the acquired satellite signals.

In this embodiment, location engine 103 estimates the code phase and the carrier frequency shift for each GPS satellite by searching for the code phase and carrier frequency shift that result in a significant magnitude (e.g., maximum, or a value exceeding a threshold value) for a correlation function. The correlation function can be, for example, a complex-valued function that correlates the received signal to a shifted replica of the PRN. One such complex-value function is the conventional In-Phase ("I") and Quadrature ("Q") integrals, known to those skilled in the art. The computational power required to compute the correlation functions for all the GPS satellites that are within the line-of-sight and for all possible code phases and all possible frequency shifts is prohibitive. Therefore, many techniques are applied to reduce the computational requirements.

A general framework for accurately capturing multiple GPS satellite signals efficiently is described in U.S. patent application ("co-pending Application II"), Ser. No. 09/888,229, entitled "Determining Location Information using Sampled Data Containing Location Determining Signals and Noise," filed on Jun. 22, 2001, also assigned to Enuvis, Inc. The disclosure of Co-pending Application II is hereby incorporated herein by reference in its entirety. Under that general framework, an initial search of the code phase and the carrier frequency spaces for each GPS satellite is facilitated by computing coherent correlation sums, such as described in U.S. patent application (Co-pending application III), Ser. No. 09/888,227, entitled "Synthesizing Coherent Correlation Sums at one or Multiple Carrier Frequencies using Correlation Sums calculated at a Coarse Set of Frequencies," filed on Jun. 22, 2001, also assigned to Enuvis, Inc. In the computation of the correlation sums, the values of the data bits in the navigational data can be used effectively to provide greater accuracy, as described in U.S. patent application ("Co-pending application IV"), Ser. No, 09/888,228, also assigned to Enuvis, Inc. The disclosures of Co-pending Applications III and IV are hereby incorporated herein by reference in their entireties.

Many variations in techniques can be used to speed up the initial search. For example, one technique, called "ultrastacking," divides the modulated received signal (i.e., the received signal modulated by the estimated carrier frequency) into 1 ms "chunks," compensates each chunk for misalignment due to the Doppler frequency shifts, sums the chunks to form a "stacked" signal, and integrates this stacked signal with the satellite PRN code over 1 ms for each selected code phase. One implementation of ultrastacking is described in the provisional patent application ("Provisional Application I"), Ser. No. 60/315,538, entitled "Ultrastacking Refinement, Frequency-following probes, submillisecond Chunking, and Mixed References for Position Determination," filed on Sep. 8, 2001, also assigned to Enuvis, Inc. The disclosure of Provisional Application I is hereby incorporated herein by reference in its entirety.

After completing coarse signal search, the initial search can then be further refined to accurately estimate the code phase and the carrier frequency using, for example, a band-limited interpolation or a template-based interpolation technique. One example of the refined search is described in U.S. patent application ("Copending application V"), Ser. No. 09/888,338, entitled "Extracting Fine-tuned Estimates from Correlation Functions Evaluated at Limited Number of Values," filed on Jun. 22, 2001. The disclosure of Co-pending Application V is hereby incorporated herein by reference in its entirety.

As each GPS satellite signal is acquired, uncertainties in parameter values common across the GPS satellite signals diminish. The diminished uncertainties can be used to limit the search space in acquisition of subsequent satellite signals. One example of such a parameter is the "clock Doppler," which is parameter of the receiver including effects from the mismatch between the clock used in the GPS satellites and the local clock at the receiver. Maintaining and updating the parameter values are carried out in SSI & SSC module 104 mentioned above. One method to update and refine parameter values and their uncertainties, which uses linear programming techniques, is described in U.S. patent application ("Co-pending Application VI"), Ser. No. 09/888,229, entitled "Determining the Spatio-Temporal and Kinematic Parameters of a Signal Receiver and its Clock by Information Fusion," filed on Jun. 22, 2001, also assigned to Enuvis, Inc. The disclosure of Co-pending Application VI is hereby incorporated herein by reference in its entirety.

Figure 2:
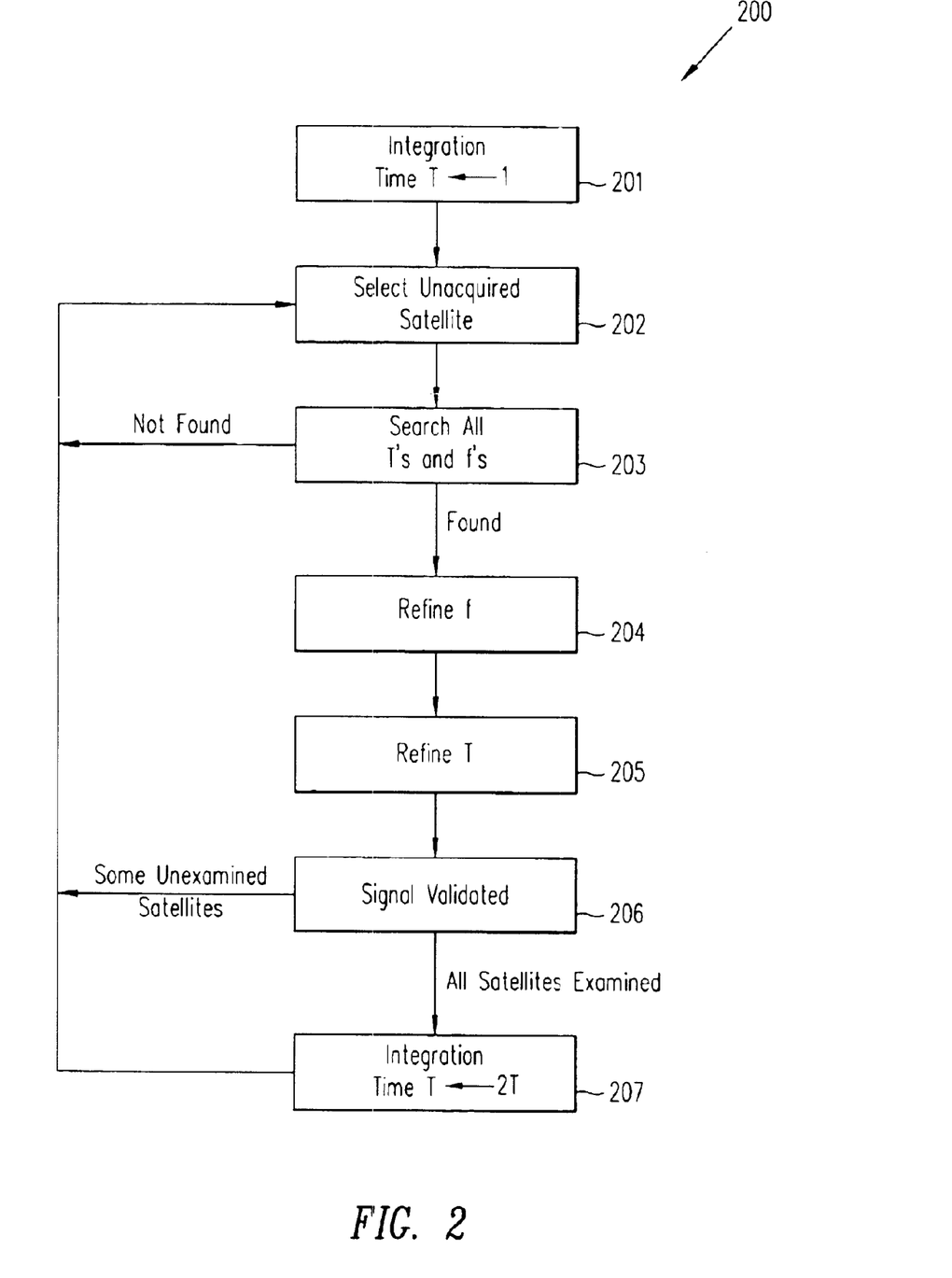
FIG. 2 shows procedure 200 suitable for use in location determination apparatus 100 for satellite acquisition.

FIG. 2 shows procedure 200 suitable for use in location determination apparatus 100 for satellite acquisition. As shown in FIG. 2, at step 201, integration time is set at 1 millisecond. At step 202, if the integration time does not exceed the total duration of sampled signal, a satellite that is yet to be acquired is selected from a list of satellites arranged in order of expected signal-to-noise ratios. At step 203, all code phase and Doppler (i.e., frequency) search ranges specified by the SSC module are examined to detect the satellite's signal. In this embodiment, a signal is "detected" when a candidate code phase and a candidate Doppler frequency yields an ambiguity function (i.e., the square of the modulus of a complex correlation sum) exceeding one or more predetermined thresholds. At steps 204 and 205, if signal detection occurred at step 203, the estimates for the Doppler frequency and the code phase, respectively, are further refined. At step 206, the signal detection is validated. If signal detection is successfully validated, the satellite is considered acquired. The SSC module is then updated to aid acquisition of other satellites. At step 207, procedure 200 returns to step 202 to detect the next satellite on the list. If some satellites remains to be acquired after all satellites on the list have been examined, the integration time is increased (in this embodiment, doubled), and the procedure returns to step 202. Procedure 200 iterates until the integration time exceeds the received signal duration (e.g., 2.048 seconds).

Procedure 200 may not be optimal because procedure 200 iterates over all candidate code phases and Doppler values without consideration that certain Doppler values and code phases may be more likely than others to yield a signal detection. For example, once the clock Doppler is accounted for, the receiver's own velocity becomes the dominant source of uncertainty in the Doppler search range. One may observe that, when a receiver experiences a weak signal condition (e.g., inside a building or in an urban area), the receiver is unlikely to have a high velocity. Accordingly, one improvement of procedure 200 may be, for example, a modification of step 203 to narrow the Doppler search range even as the integration time increases, to reflect the lower expected receiver velocity. A schedule consistent with this approach may be, for example, when the integration time is less than 32 milliseconds, assume a maximum Doppler contribution based on a receiver velocity of 160 mph. Thereafter, for each integration time step (i.e., doubling of the signal duration for the integration), the Doppler contribution is based on a receiver velocity half that of the previous integration time step (e.g., 80 mph for an integration time of 64 millisecond).

Figure 3:
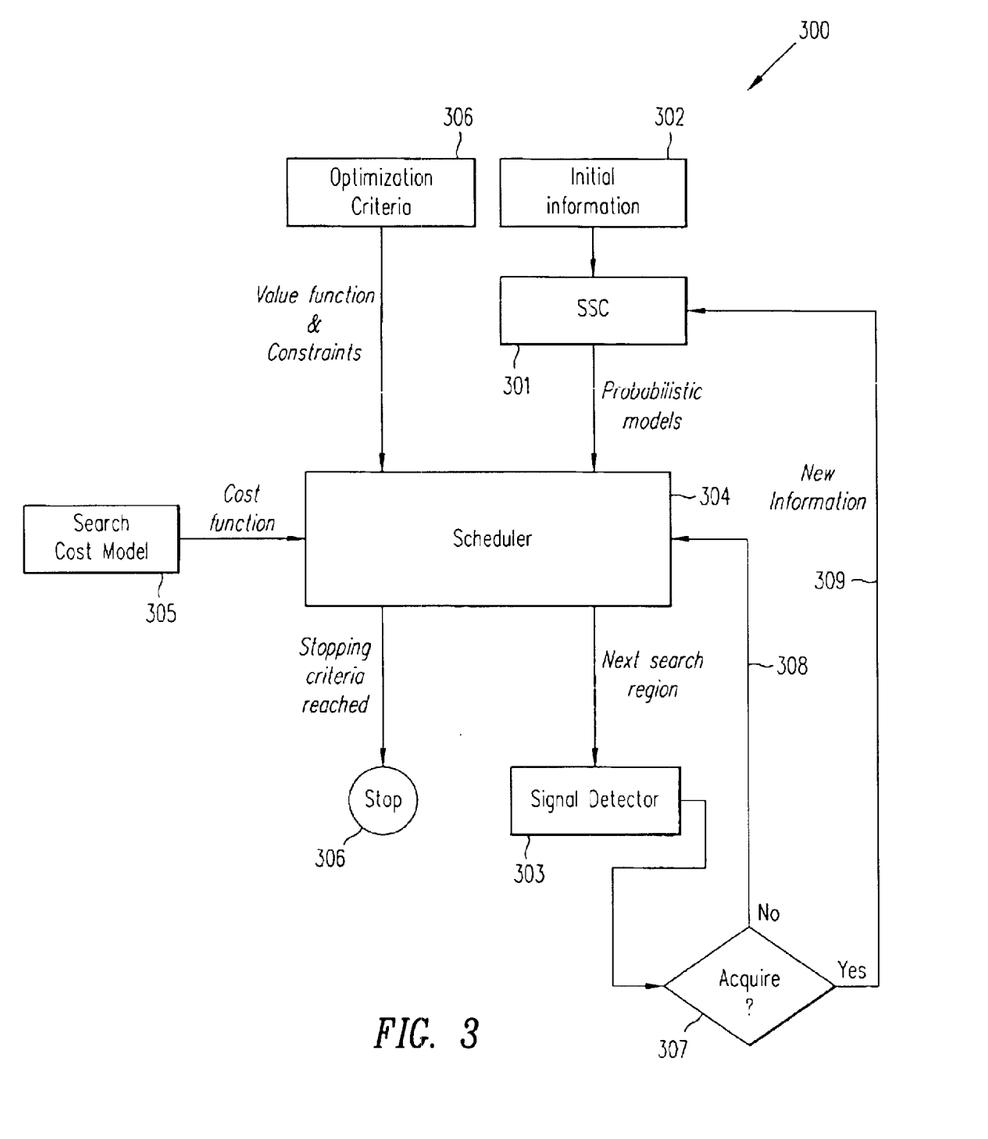
FIG. 3 illustrates method 300 for providing an optimized schedule in accordance with one embodiment of the present invention.

FIG. 3 illustrates, generally, method 300 for providing an optimized schedule in accordance with one embodiment of the present invention. Method 300 can be implemented, for example, in SSI & SSC module 104 of FIG. 1. As shown in FIG. 3, initially, signal search constrainer (SSC) 301 receives initial information 302, such as an approximate location, time stamp error, clock Doppler, clock acceleration, or receiver velocity. Initial information 302 can be provided, for example, by init module 106 of FIG. 1 based on a previous satellite acquisition. In one embodiment, each of these parameters can be expressed as a probability distribution function, or simply as an interval (e.g., 90% confidence interval). In subsequent operations, updated values of these parameters are received into SSI 301 based on the results achieved in signal detector 303, explained below. Based on the initial information or the updated parametric values and geometrical or probabilistic reasoning, SSC 301 provides to scheduler 304 a current probability distribution function or interval for each parameter. These PDFs or intervals express the likelihood of acquiring a satellite in the various parameter spaces (e.g., probabilities of finding a satellite given certain code phase, Doppler, and acceleration spaces).

Based on the PDFs or intervals received from SSC 301, a set of optimization criteria 306 and a cost function received from search cost model 305, scheduler 304 provides the next set of search conditions (e.g., the satellite, the code phase and Doppler regions, the integration time intervals, whether or not non-coherent processing or acceleration fitting should be used). Optimization criteria relate to the goals and constraints of the search. For example, the goals may include the time within which to achieve a fix, a desired accuracy, a desired sensitivity, or any combination of these goals. Constraints may include, for example, a maximum run time for a fix, or a maximum amount of memory available. A reward or value function can be defined to measure the extent to which these goals are met. The cost function can be expressed, for example, in terms of run time requirement, memory requirement, sensitivity requirement, or any combination of these requirements for each search operation. Scheduler 304's task is to provide a schedule of search conditions that maximize the reward or value function subject to the constraints and costs.

Based on the schedule from scheduler 304, signal detector 303 searches the spaces specified in the search conditions to acquire the satellites. If a search is successful, updated parameter values are fed back to SSC 301 (path 309), as described above. If the search is unsuccessful, a next best set of search conditions is obtained from scheduler 304 to continue the search (path 308). Scheduler 304 stops when all satellites are acquired, when the number of acquired satellites is sufficient to provide a location that satisfies the reward function, or when the maximum allowable time to obtain a fix is expended.

Figure 4:
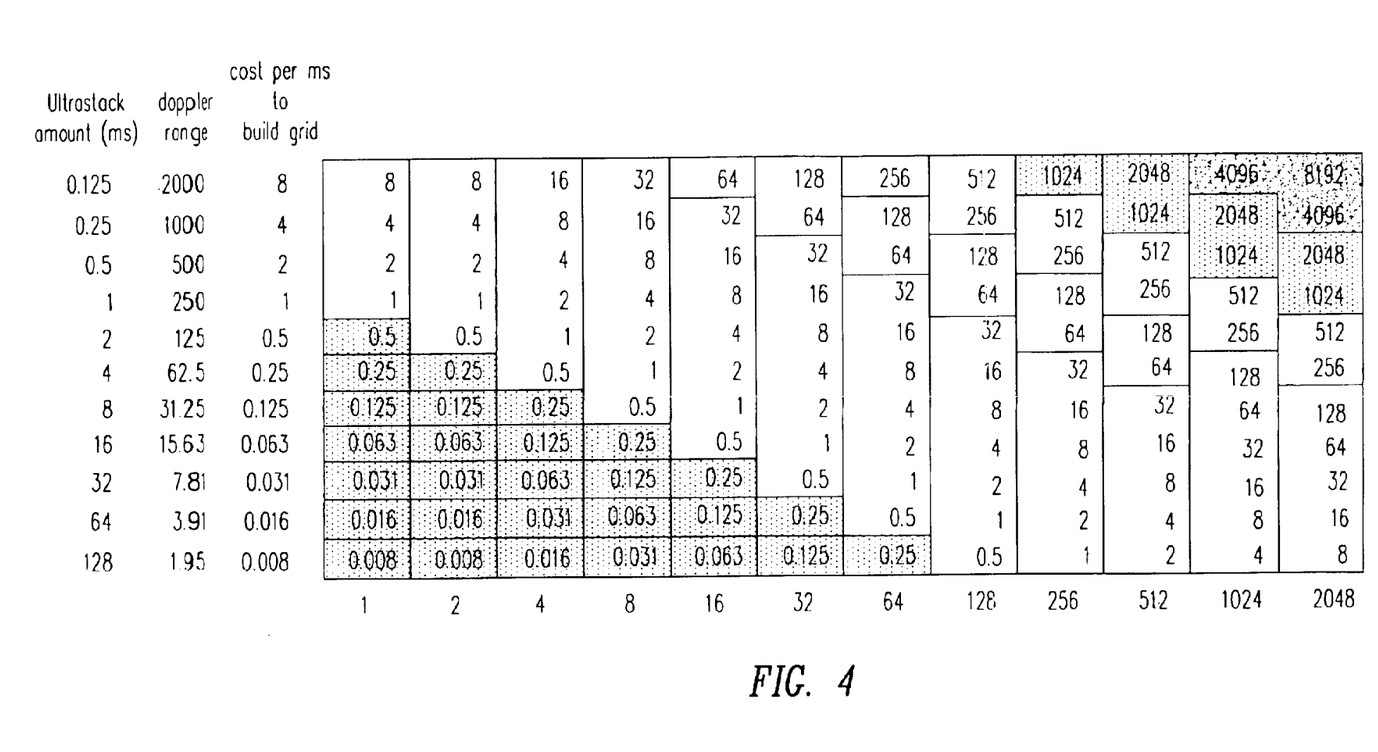
FIG. 4 shows Table I, which tabulates approximate costs for various Doppler search radii and the cost of building a grid corresponding to each Doppler search radius, as a function of integration time.

Thus, in accordance with method 300 the present invention, an optimized schedule is provided along the Doppler search range, but the entire code phase search range specified by the SSC module is searched. In this embodiment, it is observed that searching in code phase space can be carried out relatively quickly. Greater speed-up is believed achievable in the Doppler space. FIG. 4 shows Table I, which tabulates approximate costs for searching an exemplary set of code phases and Doppler values. The search cost includes the approximate cost for building a grid corresponding to each Doppler search radius, as a function of integration time, and the approximate cost for probing the grid within the corresponding Doppler search radii. In this description, the Doppler search radius is one half the Doppler search range. Note that a different grid is required for each Doppler search radius; however, for each Doppler search radius, the same grid can be used for the various integration times.

It should be understood that scheduling based on Table I in the following description is merely one example of how an optimized schedule under the present invention can be obtained. Other methods within the scope of the present invention exist and may not require assembling data of the type or form shown in Table I.

In table I, each cost is a measure of the processing time (i.e., a measure of computational intensity) required to build a 3-dimensional grid and for searching the corresponding Doppler search range, integrating over the corresponding integration time. For example, as shown in Table I, the costs of building a grid for a Doppler search range of 2000 Hz and for searching that Doppler range over an integration time of 4 milliseconds are, respectively, 32 times and 16 times the required processing times for building a grid for Doppler search range of 250 Hz and for searching that Doppler search range over one millisecond of integration time. As seen from Table I, for lower ultra-stack amounts (e.g., less than 250 Hz Doppler radius, or greater than 1 millisecond ultra-stack amount), the costs are dominated by the times required to build the grid—i.e., roughly, the cost per millisecond to build the grid doubles as the ultra-stack amount is halved. For higher ultra-stack amounts (e.g., greater than 250 Hz Doppler radius, or less than 1 millisecond ultra-stack amount), the costs of searching the grid begin to dominate, such that the total costs for building and searching the grid also roughly doubles each time the Doppler search radius doubles. The lower gray region within Table I corresponds to a region in which the ultra-stack amount exceeds signal duration. In that lower gray region, the ultra-stack technique cannot be carried out. This region need not be scheduled. At the upper gray region, the costs of searching in this region are prohibitively high. Thus, for a product that is expected to process the search space within a reasonable amount of processing time, searching Doppler effects in the upper gray region may prove impossible.

For each entry in Table I, a reward function corresponding to the probability of satellite acquisition can be calculated for each cell. To determine such a probability, a joint probability distribution in both the integration time dimension and the Doppler search range dimension is estimated. Along the integration time dimension, the probability distribution is observed to be relatively flat when plotted in a log scale. Along the Doppler search radius dimension, however, the probability distribution is observed to depend upon both the expected receiver velocity and the clock drift (i.e., any change in clock Doppler over time). A possible probability distribution as a function of a change in Doppler (i.e., the current estimated Doppler f less the Doppler effect $f_o$ estimated in the last fix) is the function $$\frac{1}{|f - f_o|}$$

to take advantage of both an expectation of both a low receiver velocity and that the receiver clock Doppler does not materially vary since the time of the last location fix. This probability distribution results in a flat or constant probability distribution of satellite acquisition along the Doppler search radius dimension.

Thus, in this embodiment described in conjunction with Table I, the joint probability distribution (i.e., the reward distribution) is flat in both the log integration time dimension and the Doppler search radius dimension. For each cell in Table I, one can define a "score" to be the ratio of the reward for searching that cell to the cost of the search. So defined, the costs in the cells of Table I are inversely proportional to their respective scores. Each score represents a measure of cost/benefit for searching the associated cell. One can divide each column of Table I into sections in which the costs are within a predetermined range, as shown in FIG. 4. For example, in FIG. 4, cost ranges of (0, 32), (64, 128), (256, 512), (1024, 2048) are defined for integration times of up to 512 milliseconds, and cost ranges of (0, 128), (256, 512), (1024, 2048) and (4096, 8192) are defined for integration times between 1024 milliseconds and 2048 milliseconds. One may observe that the processing time of a "32" cost is relative short because of the computational power of the digital signal processor in location determination apparatus 100. Thus, to maximize the probability of satellite acquisition per millisecond of integration time, for example, one can adopt a schedule for searching Doppler values that uses as the initial Doppler search radius a subset of the Doppler search radius associated with the maximum Doppler search range in that section. Such a schedule is illustrated by FIG. 5.

Figure 5:
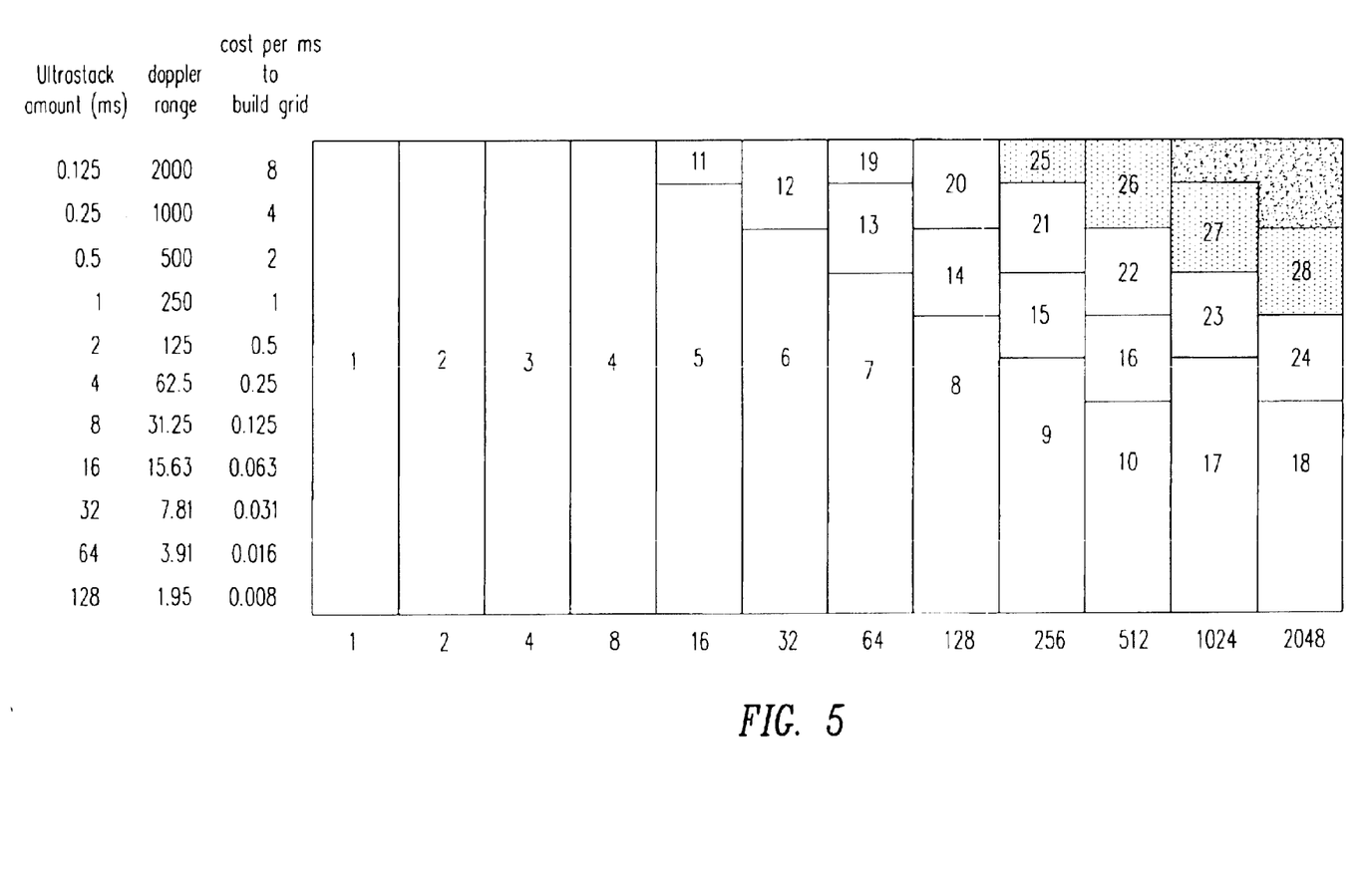
FIG. 5 shows a schedule for searching the Doppler space aimed at maximizing the probability of satellite acquisition per millisecond of integration time, in accordance with one embodiment of the present invention.

In the schedule of FIG. 5, the relatively low cost search ranges are scheduled before the higher cost search ranges, and the schedule is arranged such that a grid is shared without rebuilt for multiple integration times. For example, in the schedule of FIG. 5, a maximum Doppler search region and a minimum Doppler search region are defined for each satellite. The maximum Doppler search region is provided by the SSI and SSC module. Initially, a grid is built for a minimum Doppler search region (e.g., Doppler search radius 31.25 Hz) at integration time slice 1. The minimum Doppler search region can be derived, for example, from an estimated receiver velocity provided from the SSC module. The maximum and minimum Doppler search regions are not required to have a common centering point. If the satellite is not acquired within this integration time slice 1 within this minimum Doppler search region, the integration time is increased and the search moves into integration time slices 2–10 successively. In these successive searches in integration time slices 2–10, the correlation grid is reused. If the satellite is not acquired after integration time slice 10 within this minimum Doppler search region, a new grid is built quadrupling the Doppler search range to a Doppler search radius of 125 Hz, and the search is repeated for integration time slices 1–9. (The cost of searching Doppler search radius 125 Hz at integration time slice 10 exceeds the threshold cost of 32 for integration time slice 10.) In this embodiment, the Doppler search range is expanded by a factor of 4, rather than 2, as the cost of building a new grid is high. Finally, if the satellite is not acquired after expanding the Doppler search region to the maximum Doppler search range, search within the integration time slices 11–16 are carried out. Similarly, search within integration time slices 19–24 and 25–28 are carried out in like manner successively. The dark gray region at the upper right corner of FIG. 5 is unlikely to be searched because of the high cost and the low probability of satellite acquisition.

The above detailed description is provided to illustrate specific embodiments of the present invention and is not intended to be limiting. Numerous variations and modifications within the scope of the present invention are possible. The present invention is set forth in the following claims.

We claim:

1. In a location determination apparatus, a method for scheduling a search of a parameter space, comprising:

dividing the parameter space into a plurality of search regions, each search region comprising multiple parameter values within the parameter space;

for each search region, computing a figure of merit associated with that search region; and scheduling searches of said search regions according to an ordering of said figures of merit.

2. A method as in claim 1, wherein said figure of merit associated with each search region relates to a cost, and wherein said scheduling schedules in increasing order of cost.

3. A method as in claim 1, wherein said computing comprising:

calculating a reward and a cost for each search region; and calculating as said figure of merit a function of said reward and said cost.

4. A method as in claim 3, wherein said reward is determined according to a probability distribution.

5. A method as in claim 4, wherein said location determination system comprises a GPS receiver and wherein said probability distribution relates to the probability of acquiring a signal of a satellite.

6. A method as in claim 1, wherein said parameter space comprises numerous code phase values.

7. A method as in claim 1, wherein said parameter space comprises a Doppler frequency range.

8. A method as in claim 1, wherein said parameter space comprises a range of integration time intervals.

9. A method as in claim 8, wherein said method comprises finding a code phase and a Doppler value in said Doppler frequency range such that an ambiguity function exceeds a predetermined value.

10. A method as in claim 9, wherein said method evaluates said ambiguity function for multiple integration time intervals.

11. A method as in claim 8, wherein each of said search regions is associated with a maximum velocity of said location determination apparatus.

12. A method as in claim 11, wherein said scheduler schedules said search of said search regions with preference given to search region associated with smaller maximum velocities as integration time increases.

13. A method as in claim 10, wherein said location determination system comprises a GPS receiver, and wherein a correlation grid is created for each search region of said Doppler frequency range to acquire a signal of a satellite, said correlation grid being further associated with a code phase range, and wherein said scheduling schedules, for each of said search regions, evaluation of said ambiguity function for said multiple integration time intervals before searching another one of said search regions.

14. A method as in claim 13, wherein a stacking technique is applied in evaluating said ambiguity function.

15. A method as in claim 13, wherein each search region is associated with a sub-range of said Doppler frequency range, and wherein said scheduling schedules said search regions in order of increasing sub-ranges.

16. A method as in claim 15 wherein, in said scheduling, each successive sub-range is greater the previous sub-range by a factor of 4.

17. A method as in claim 1, wherein said scheduling schedules search regions having a cost less than a predetermined value.

18. A method as in claim 2, wherein said cost relates to searching said search region.

19. A method as in claim 13, wherein said cost relates to building said correlation grid.

20. A method for signal detection by searching values of a plurality of parameters that provide a match to a received signal, comprising:

receiving a set of optimization criteria;

for each parameter, receiving a cost function relating to searching a range of values for said parameter;

receiving a probabilistic model of signal detection for each parameter;

based on said optimization criteria, said cost functions and said probabilistic models, determining a schedule for searching for said values; and performing signal detection in accordance with said schedule.

21. A method as in claim 20, wherein said schedule specifies the order in which said parameters are searched.

22. A method as in claim 21, wherein said optimization criteria comprises a value function.

23. A method as in claim 21, wherein optimization criteria comprises system constraints.

24. A method as in claim 23, wherein said system constraints comprise a maximum run time.

25. A method as in claim 24, wherein said system constraints comprise a maximum memory size.

26. A method as in claim 20, wherein said cost function comprises a cost of building a search data structure.

27. A method as in claim 26, wherein said cost function further comprises a cost of searching said search data structure.

28. A method as in claim 20, wherein signal detection relate to detecting a GPS signal sent from a satellite, wherein said parameters comprise code phase.

29. A method as in claim 20, wherein signal detection relate to detecting a GPS signal sent from a satellite, wherein said parameters comprise a Doppler frequency.

30. A method as in claim 20, further comprises, upon successfully detecting a signal, using values of said parameters found to adjust said ranges of said parameters.

31. A method as in claim 20, wherein one of said probabilistic models comprises a probability distribution function.

32. A method as in claim 20, wherein one of said probabilistic models comprises an interval of values representing a predetermined level of confidence.

33. A method as in claim 27, wherein said ranges of said parameters are adjusted using a linear programming method.

* * * * *